(12) United States Patent
Srinivasan

(10) Patent No.: US 6,461,781 B1
(45) Date of Patent: Oct. 8, 2002

(54) XEROGRAPHIC PHOTORECEPTOR CO-BINDER COMPOSITIONS

(75) Inventor: Kasturi Rangan Srinivasan, Longmont, CO (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 09/896,753

(22) Filed: Jul. 2, 2001

(51) Int. Cl.$^7$ ................................................ G03G 15/02
(52) U.S. Cl. ...................................................... 430/59.6
(58) Field of Search ......................................... 430/59.6

(56) References Cited

U.S. PATENT DOCUMENTS

| 6,001,523 A | 12/1999 | Kemmesat et al. |
| 6,042,980 A | 3/2000 | Kierstein et al. |
| 6,117,967 A | 9/2000 | Fuller et al. |

*Primary Examiner*—Mark Chapman
(74) *Attorney, Agent, or Firm*—John A. Brady

(57) ABSTRACT

Polycarbonate diols and polyethercarbonate diols having only aliphatic hydrocarbon moieties are useful as co-binders in the charge transport layers of electrophotographic photoreceptors of xerographic printers and copiers. Preferably, the co-binders have number molecule or weights of from about 200 to about 2000.

27 Claims, No Drawings

XEROGRAPHIC PHOTORECEPTOR CO-BINDER COMPOSITIONS

BACKGROUND OF THE INVENTION

This invention relates to xerographic printers or copiers and more particularly to co-binders for use in the charge layer of the electrophotographic photoreceptor portion of the xerographic "drum" or "plate" utilized in such printers or copiers.

Xerographic printers operate by passing the photoconductor drum surface close to a positively or negatively charged source, usually a wire or a charge roll to create a charge on the drum. The material to be copied is projected onto the photoreceptor through appropriate lenses and the charge on the drum is discharged from different portions of the photoconductor proportionately to the intensity of the light projected on different parts of the photoreceptor. The photoreceptor is then exposed to oppositely charged "toner" powder or powders as needed to retain a coating of desired color or colors on the drum. The toner coated drum is then exposed to an oppositely charged copy material which is generally paper, plastic or fabric. The charged copy material attracts the toner onto its surface to form the desired image. On heating, the toner is permanently fixed on the copy material surface.

Typically, a photoreceptor coating generally includes a charge generation layer (CGL) and a charge transport layer (CTL) which overlay one of a "sub" or "barrier" layer coating the drum or plate surface itself. The CGL preferably is made up of pigments or dyes dispersed in a polymer binder but the pigments can also be dispersed in a liquid solvent. The binder improves the dispersion stability and improves adhesion of the CGL to the plate and sub or barrier layers on the plate.

Typical pigments and dyes utilized in photoreceptors include one or more phthalocyanines, squaraines, azodyes, perylenes. Typical polymer binders are the polyvinyl butyrals, phenoxy resins, epoxy resins, polycarbonates and polyacrylates. The binders are essentially inert with respect to the desired electrophotographic properties of the CGL. If not properly formulated, however, the pigments and/or binders can affect the sensitivity of the photoreceptor. Similarly, the CTL also contain polymeric binders. Typically, the binders can typically include one or more of polycarbonates, polyesters, copolymers of polymers having reactive ester and carbonate groups, phenoxy resins, epoxy oxy resins, and silicones. The CTL is typically about 5 to about 40 microns in thickness. The preferred dual layer negative charging photoreceptors of this invention exhibit improved electrical stability, lower dark decay and form stable prints through the life of the photoreceptor. However, the photoreceptors can also be a part of a positive charge system when hole transport materials are substituted, at least in part for the preferred electron transport material.

Exemplary references include:

U.S. Pat. No. 6,001,523 issued to Kemmesat, Neely, Randolph & Srinivasan; U.S. Pat. No. 6,042,980 to Kierstein and Srinivasan; and U.S. Pat. No. 6,117,967 to Fuller, Yannus, Pai, Silvestri, Naran, Limberg and Renfer. These patents summarize and/or refer to a variety of photoconductor technology.

SUMMARY OF THE INVENTION

Aliphatic carbonate diols are co-binders in the electrophotographic portion of xerographic plates and drums utilized in xerographic copiers. The carbonate diols have the structural formula:

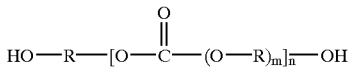

where R is an aliphatic hydrocarbon containing about 3 to about 13 carbon atoms, m is about 1 to about 7 and n is about 3 to about 50. Preferably, R contains about 3 to about 13 carbon atoms; more preferably R contains about 4 to about 10 carbon atoms; and most preferably R contains about 4 to about 6 carbon atoms. Preferably, n is about 3 to about 30 and more preferably about 3 to about 15.

The aliphatic hydrocarbon moieties are preferably linear but can have a low molecular weight primary and secondary substitution, e.g., methyl and isopropyl.

The preferred polyaliphatic carbonate diols are:

poly(hexamethylene carbonate) diol (PHMC) having the formula:

where m is 1 hexamethylene unit and n is 3 to about 15, a poly(polytetrahydrofuran carbonate) diol having the formula:

where m is 3 to about 4 polytetrahydrofuran units and n is 3 to about 15 repeating units.

These co-binders have number average molecular weights ranging from about 200 to about 10,000, more preferably from about 200 to about 5000 and, most preferably from about 200 to about 2000. Preferably these polymeric CTL compounds range from flexible viscous semi-solids to substantially rigid solids at room temperature. More preferably, these materials are flexible viscous solids.

The preferred binders for CTL formation are polycarbonates, polyesters, polystyrenes, polyvinyl chloride, epoxy resins, phenoxy resins, polyvinylbutyral and vinyl chloride/vinyl acetate copolymers and mixtures thereof. The most preferred binder compositions are with polycarbonates, polyesters, polystyrenes, and mixtures thereof. The use of polycarbonates is discussed in depth in U.S. Pat. No. 6,001,523. These binders can be used with various charge transport compounds, such as aryl amines, benzidines, hydrazones, stilbenes and mixtures thereof. In addition to the polymer binders in the charge transport layer, additives such as polytetrafluoroethylene, and polysiloxanes can be used, so as to help improve the wear properties of the photoconductor drum.

The amount of co-binders utilized depends on the effects of specific binders and other constituents of the CTL as well as the costs of the specific co-binder chosen for use in a pre-selected CTL composition. Co-binder concentrations are subjects of cost benefit analysis. In some situations, co-binder concentrations greater than about 10% by weight may be useful, but concentrations up to about 7.5% are currently preferred and concentrations of about 5% provide practical physical and price benefits.

In the following examples, the co-binder material is formulated in a solution or dispersion with a benzidine, e.g., N,N'-di(3-methylphenyl)-4,4'-diphenyl benzidine (TPD) or N,N-diethylaminobenzaldehyde- 1,1-diphenylhydrazone (DEH) transport material by mechanically stirring the charge transport layer ingredients preferably in a suitable solvent or solvent mixture at temperatures ranging from 25° C. to about 50° C. Solvents typically used in preparing charge transport solutions or dispersions include but are not limited to tetrahydrofuran, dioxane, dioxolane, halogenated hydrocarbons, ketones, esters and mixtures thereof. A minor amount of surfactant is added, where needed, to achieve the proper degree of dispersion or solution. The charge transport binder blends preferably utilize one or both of polycarbonate-A and polycarbonate Z. Polycarbonate-A (PC-A) utilized in the examples set out below are marketed under the tradename Makrolon was obtained from the Coating and Colorants Division of The Bayer Corporation, Pittsburgh, Pa. USA. Polycarbonate-Z (PC-Z, lupilon-400Z) was obtained from Mitsubishi Engineering Plastics of New York, USA. The resulting PHMC diol co-binder was used at about 5% by weight of the binder in the charge transport layer.

This formulation was coated on a 45% type IV oxotitanium phthalocyanine pigment dispersed in a polyvinyl butyral/epoxy resin blend. Polyvinylbutyral (S-Lec-B BX-55Z grade) was obtained from Sekisui Chemical, New York. Epoxy resin was obtained from Shell Chemical.

Polyhexamethylene carbonate diol (PHMC), marketed by Aldrich Chemical Company, Wisconsin, USA was formulated as a co-binder in a TPD-based charge transport layer. The blend of binder and co-binder corresponds to a mixture with polycarbonates (PC), specifically polycarbonate-A and polycarbonate Z. One blend was with 100% Polycarbonate A and the other contained 25% Polycarbonate Z. About 5% co-binder was added to each of the blends. The formulations were coated on a 45% type IV oxotitanium phthalocyanines pigment dispersed in a polyvinyl butyral/epoxy resin blend. The coated drums were used as one of Ultraviolet (UV) radiation cured and non-UV cured and evaluated for life in a Lexmark Optra S 2450 printer.

In the various tests, the control drums were coated with blends containing no PHMC diol, but containing 2% TOSPEARL (Tospearl-120) silicone microspheres. The silicone microspheres were manufactured by GE Silicones of New York, USA. The silicone microspheres have been previously shown to exhibit superior electrical and print performance with respect to wear, coating quality and print quality (U.S. Pat. No. 5,994,014).

The formulation and results are presented below:

EXAMPLE 1

TABLE 1

Formulations of PHMC diol polymer in a 30% TPD polycarbonate transport

| Compositions | 1 | 2 | 3 | 4 |
|---|---|---|---|---|
| Benzidine | 21 g | 21 g | 21 g | 21 g |
| Polycarbonate-A | 36.75 g | 34.91 g | 49 g | 49 g |
| Polycarbonate-Z | 12.25 g | 11.64 g | 0 g | 0 g |
| PHMC diol | 0 g | 2.45 g | 0 g | 2.45 g |
| Tetrahydrofuran | 210 g | 210 g | 210 g | 210 g |
| 1,4-Dioxane | 70 g | 70 g | 70 g | 70 g |
| Tospearl-120 | 1.4 g | 0 g | 1.40 g | 0 g |
| Surfactant (DC-200)** | 6 drops | 6 drops | 6 drops | 6 drops |

*Examples 1 and 3 are controls

**The surfactant is manufactured by Dow Corning, USA and marketed under the DC-200 brand.

TABLE 2

Effect of Voltage on Electrical Cycling

| | UV Cure | $V_0 \mu J/cm^2$ 0–1000 cyc. | $V_{0.2} \mu J/cm^2$ 0–1000 cyc. | $V_{0.4} \mu J/cm^2$ 0–1000 cyc. | $V_{0.7} \mu J/cm^2$ 0–1000 cyc. | Dark Decay 0–1000 cyc. |
|---|---|---|---|---|---|---|
| Control 1 | No | −848/−844 | −233/−237 | −116/−129 | −85/−100 | 38/73 |
| Composition 1 | No | −848/−847 | −125/−225 | −125/−125 | −112/−115 | 34/59 |
| Composition 1 | Yes | −853/−841 | −262/−257 | −137/−151 | −126/−141 | 66/98 |

Electrical cycling fatigue was carried out in an electrostatic tester, wherein the drums are charged and discharged 1000 times. The initial charge/discharge voltage, and the corresponding charge/discharge voltages following the 1000 cycle test are shown and were used to evaluate the "electrical" fatigue observed in the photoconductor drum.

In a similar manner, a drum was coated with polycarbonate-Z (PC-Z) using the PHMC diol as a co-binder, and these results are presented below:

TABLE 3

Effect of PHMC diol in a 30% TPD/PC-Z transport on electrical cycling fatigue

| | UV Cure | $V_0 \mu J/cm^2$ 0–1000 cyc. | $V_{0.2} \mu J/cm^2$ 0–1000 cyc. | $V_{0.4} \mu J/cm^2$ 0–1000 cyc. | $V_{0.8} \mu J/cm^2$ 0–1000 cyc. | Dark Decay 0–1000 cyc. |
|---|---|---|---|---|---|---|
| Control 2 | No | −852/−858 | −190/−209 | −122/−132 | −107/−114 | 63/94 |
| Composition 2 | No | −848/−849 | −179/−188 | −104/−99 | −91/−87 | 71/101 |
| Composition 2 | Yes | −853/−849 | −254/−266 | −148/−163 | −134/−148 | 86/135 |

From Tables 2 and 3, the PHMC diol drum coatings are shown to exhibit stable electrical cycling fatigue in comparison to the control drums (PC-A or PC-A/Z). At 5% concentration (no UV cure), PHMC diol exhibits better fatigue properties (electrostatics and dark decay) than a 1% Tospearl-120 silicone microsphere containing photoconductor drum coating.

UV curing of PHMC diol-coated drum for about 25 minutes results in lowering the sensitivity with an increase in discharge voltage and dark decay.

A further evaluation of the material was carried out by testing its effect on the print quality. The photoconductor drum coatings listed in Tables 1 and 2 were life-tested in a Lexmark Optra S 2450 printer. Life-test evaluations were carried out on a Lexmark Optra S 2450 printer. The run mode was print four pages and pause, in a simplex mode. One method for tracking the stable print performance is to evaluate the gray scale pattern in a 1200 dpi (dots-per-inch). This corresponds to a systematic change in a gray scale page from an all-black to white through a series of 128 boxes corresponding to various shades of gray (WOB, White-on-Black). For a stable print performance, the box corresponding to the start-of-life gray scale should be similar to that at the end-of-life scale. In a similar manner, the photoconductor drum should exhibit minimum fatigue, in a continuous run mode and on a cold start (start after a period of rest), and variations observed would correspond to a hot-to-cold variation. In a similar manner, print fatigue would correspond to change in the WOB following the life-test evaluation. Results based on a life-test are presented below:

Tospearl-120 silicone microspheres based CTL (PC-A/Z 100/0 and 75/25) exhibit fatigue in their electrostatics through product life. Also, in both cases, the White on Black "gray scale" evaluation changed through the life of the drums. The drums also exhibited hot-to-cold variations. UV cured PHMC diol containing CTLs exhibited smaller changes in electrostatics, and the White on Black results remain relatively flat through the life of the drum. The drums also exhibit minimal change between hot and cold electrical characteristics and print quality.

EXAMPLE 2

PHMC diol-based transports were coated on a 45% TiOpc in BX-55Z/Polyhydroxystyrene (100/0 and 90/10) binder mixture. The drums were evaluated for initial electrical characteristics and cycling fatigue (1 k electrical cycling).

TABLE 6

Formulation 2 for PHMC Diol

| | Control 3 | Composition 3 |
|---|---|---|
| Benzidine | 7.8 g | 7.8 g |
| Polycarbonate-A | 13.65 g | 12.96 g |
| Polycarbonate-Z | 4.55 g | 4.33 g |
| PHMC diol | 0 g | 0.91 g |
| Tetrahydrofuran | 78 g | 78 g |
| 1,4-Dioxane | 26 g | 26 g |
| Surfactant (DC-200) | 3 drops | 3 drops |

TABLE 4

Life Test Results for PHMC Diol-Based Transport layers (CG: 45% TiOpc; BX-55Z/Epoxy resin), CTL: 30% TPD, Polycarbonate-A/Z (100/0)

| | UV Cure | Print count | Hot/cold | Discharge Voltage (−Vr) | White on Black |
|---|---|---|---|---|---|
| Control 1 | No | 0 k/10 k/20 k/30 k* | Hot | 105/162/149/142 | 12/13/10/15 |
| | | 0 k/10 k/20 k/30 k | Cold | 144/143/140/136 | 9/13/10/9 |
| Composition 1 | No | 0 k/10 k/20 k/27 k | Hot | 95/102/105/89 | 13/12/10/15 |
| | | 0 k/10 k/20 k/27 k | Cold | 106/116/100/90 | 10/12/10/15 |
| Composition 1 | Yes | 0 k/10 k/20 k/28 k | Hot | 89/94/77/78 | 10/9/10/10 |
| | | 0 k/10 k/20 k/28 k | Cold | 99/91/89/75 | 10/10/10/10 |

*k = 1000

TABLE 5

Life Test Results for PHMC Diol-based Transport Layers (CG: 45% TiOpc; BX-55Z/Epoxy resin), CTL: 30% TPD, Polycarbonate-A/Z (75/25)

| | UV Cure | Print count | Hot/Cold | Discharge Voltage (−Vr) | White on Black |
|---|---|---|---|---|---|
| Control 2 | No | 0 k/10 k/20 k/30 k* | Hot | 102/126/124/122 | 13/11/9/15 |
| | | 0 k/10 k/20 k/30 k | Cold | 126/118/115/107 | 10/20/9/17 |
| Composition 2 | No | 0 k/10 k/20 k/27 k | Hot | 91/91/94/87 | 11/8/9/16 |
| | | 0 k/10 k/20 k/27 k | Cold | 109/101/102/86 | 9/13/9/13 |
| Composition 2 | Yes | 0 k/10 k/20 k/28 k | Hot | 92/104/95/98 | 9/10/9/10 |
| | | 0 k/10 k/20 k/28 k | Cold | 102/97/100/85 | 10/10/11/10 |

* k = 1000

TABLE 7

Evaluation of Composition 2 in a PC-A/Z (75/25) Matrix and with a CGL Containing 45% TiOpc; BX-55Z/Polyhydroxystyrene (100/0 or 90/10)

| PHMC diol Composition | CG BX55/ PHS | $V_0 \mu J/cm^2$* (0 k/1 k) | $V_{0.2} \mu J/ cm^2$ (0 k/1 k) | $V_{0.4} \mu J/ cm^2$ (0 k/1 k) | $V_{0.8} \mu J/ cm^2$ (0 k/1 k) | Dark Decay (0 k/1 k) |
|---|---|---|---|---|---|---|
| Control 3 | 100/0 | −859/−857 | −214/−203 | −145/−140 | −128/−124 | 69/143 |
| Control 3 | 90/10 | −850/−863 | −188/−186 | −127/−121 | −112/−107 | 51/67 |
| Comp. 3 | 100/0 | −844/−862 | −216/−217 | −151/−150 | −131/−133 | 48/103 |
| Comp. 3 | 90/10 | −850/−850 | −242/−349 | −187/−312 | −175/−298 | 32/40 |

*k = 1000

PC-A/Z composition with a BX-55Z/PHS binder blends in CG, exhibits stable fatigue through 1 k electrical cycling, and also a smaller change in dark decay. It is interesting to note the interaction of the PHMC diol with the CG binder system. A 45% TiOpc in BX-55Z/PHS (100/0) exhibits stable electrical characteristics on cycling, although the dark decay increases. However, severe negative fatigue is observed when PHMC diol co-binder transport layer is coated on a BX-55Z/PHS (90/10) CG. This effect must be a direct consequence of the interaction between the dihydroxy end groups of PHMC and the phenolic hydroxy groups of the polyhydroxystyrene (PHS). To probe the interaction further, various concentrations of PHMC diol (0%, 1%, 2% and 5%) were used (Table 6), and coated on 45% TiOpc dispersion with a BX-55Z/PHS/polymethylphenylsiloxane (BX55Z/PHS/PMPS 86/7/7) as a ternary polymer system in the CGL (Table 8). These drums were also electrically cycled and results are summarized in Table 9.

EXAMPLE 3

TABLE 8

Formulation for PHMC Diol for Concentration Study

| | Control 4 | Composition 4 | Composition 4a | Composition 4b |
|---|---|---|---|---|
| Benzidine | 7.8 g | 7.8 g | 7.8 g | 7.8 g |
| Polycarbonate-A | 13.65 g | 13.51 g | 13.37 g | 12.96 g |
| Polycarbonate-Z | 4.55 g | 4.50 g | 4.45 g | 4.33 g |
| PHMC diol | 0 g | 0.26 g | 0.52 g | 0.91 g |
| Tetrahydrofuran | 78 g | 78 g | 78 g | 78 g |
| 1,4-dioxane | 26 g | 26 g | 26 g | 26 g |
| Surfactant (DC-200) | 3 drops | 3 drops | 3 drops | 3 drops |

The increase in PHMC diol concentration in the transport layer results in a corresponding increase in the discharge voltages, at higher laser illumination energies. At 1% and 2% PHMC diol, the drum exhibits stable electrostatic behavior, but shows a negative fatigue at about 5% concentration. The onset of negative fatigue may be dictated by the critical concentration of PHMC diol, in this case, in the 2% to 5% range. The addition of PHMC diol lowers the dark decay change on electrical cycling.

EXAMPLE 4

Hydrazone transport: PHMC diol was evaluated as an additive, at a 5% concentration in a PC-A binder with N,N-diethylaminobenzaldehyde-1,1-diphenylhydrazone (DEH) charge transport material. The CGL used was a 45% TiOpc; BX-55Z/Epoxy resin (3/1), and the drums evaluated for electrical cycling fatigue. Results are presented below:

TABLE 10

Formulations for PHMC Diol in 40% DEH Transports

| | Control 5 | Composition 5 |
|---|---|---|
| DEH | 37 g | 37 g |
| Polycarbonate-A | 54 g | 51.3 g |
| PHMC diol | 0 g | 2.7 g |
| Tetrahydrofuran | 270 g | 270 g |
| 1,4-Dioxane | 90 g | 90 g |
| Savinyl Yellow | 0.70 g | 0.70 g |
| Surfactant (DC-200) | 6 drops | 6 drops |

TABLE 9

Electrical Cycling Results for 0%–5% PHMC Diol in a 30% TPD Transport, on a 45% TiOpc; BX-55Z/PHS/PMPS Charge Generation Layer

| | PHMC Diol (%) | Ct. wt (mg/in)$^2$ | $V_{0.0} \mu J/cm^2$ (0 k/1 k) | $V_{0.2} \mu J/cm^2$ (0 k/1 k) | $V_{0.4} \mu J/cm^2$ (0 k/1 k) | $V_{0.8} \mu J/cm^2$ (0 k/1 k) | Dark Decay (0 k/1 k) |
|---|---|---|---|---|---|---|---|
| Control 4 | 0% | 16.7 | −848/−852 | −201/−189 | −95/−95 | −83/−85 | 43/81 |
| Comp. 4 | 1% | 16.7 | −846/−844 | −193/−184 | −108/−106 | −97/−96 | 37/60 |
| Comp. 4a | 2% | 18.4 | −851/−866 | −194/−185 | −125/−123 | −113/−113 | 36/63 |
| Comp. 4b | 5% | 17.1 | −850/−844 | −198/−207 | −128/−147 | −117/−136 | 42/49 |

The effect of using DEH was tested next:

TABLE 11

PHMC Diol in DEH transport (CG: 45% TiOpc; BX-55Z/Epoxy resin (25/75))

| | UV Cure | $V_0 \mu J/cm^2$ (0 k/1 k) | $V_{0.2} \mu J/cm^2$ (0 k/1 k) | $V_{1.0} \mu J/cm^2$ (0 k/1 k) | Dark Decay (0 k/1 k) |
|---|---|---|---|---|---|
| Control 5 | Yes | −847/−844 | −214/−216 | −123/−148 | 71/118 |
| Composition 5 | Yes | −848/−850 | −208/−231 | −115/−148 | 54/93 |

The addition of PHMC diol lowers the dark decay and dark decay fatigue.

EXAMPLE 5

Poly(polytetrahydrofuran)carbonate diol (PTHFC diol): Poly(polytetrahydrofuran)carbonate diol is similar in effect to PHMC diol. This is a commercially available material, and two different molecular weights were used. The number average molecular weights are either 1000 or 2000, and it is a viscous liquid at room temperature.

Formulations involving this material were prepared and evaluated in a manner similar to that used with PHMC diol. The following transports were coated with either Charge Generation 1 or 2 (CGI or CG2).

CG1: 45% TiOpc; 55% (BX55Z polyvinylbutyral: Epoxy resin 1:1)

CG2: 55% TiOpc; 45% (BX55Z/ Polymethylphenylsiloxane/Polyhydroxystyrene 86/7/7).

TABLE 12

Charge Transport Formations of TPD and PC-A with Tospearl-120 or PTHFC Diol

| | CT1 | CT2 |
|---|---|---|
| Benzidine | 27.7 g | 27.9 g |
| Polycarbonate-A | 51.4 g | 51.9 g |
| PTHFC diol | 0 g | 0.8 g |
| Tetrahydrofuran | 268 g | 268 g |
| 1,4-Dioxane | 89 g | 89 g |
| Tospearl | 1.6 g | 0 g |
| Surfactant (DC-200) | 5 drops | 5 drops |

The following table compares the stability of photoconductor drums comprising either CG1 or 2 with CT1 and CT2. The stability is as determined in a Lexmark Optra S 2450 printer. The test was carried out at a hot/wet environment (78° F./80% RH) chamber.

TABLE 13

Evaluation of PTHFC Diol

| | CG1/CT1 | CG1/CT2 | CG2/CT1 | CG2/CT2 |
|---|---|---|---|---|
| Charge/Discharge Voltages (Initial prints) | −917/−112 | −917/−60 | −885/−103 | −898/−41 |
| Charge/Discharge Voltages (@]12K prints) | −865/−143 | −873/−49 | −926/−154 | −973/−39 |
| Fatigue over 12K prints Charge/Discharge Voltages | +52/−31 | +44/+11 | −61/−51 | −75/+2 |

As can be seen from Table 13, unlike a control drum, photoconductors based on PolyTHFC diol were relatively more stable.

In a similar manner, PTHFC diol was evaluated as an additive in a hydrazone transport. As in Table 12, the charge generation layers were made up of either an epoxy resin or a polyhydroxystyrene resin, and are listed below:

CG1: 55% TiOpc; 55% (BX55Z polyvinylbutyral:Epoxy resin 1:1)

CG2: 55% TiOpc; 45% (BX55Z/ Polymethylphenylsiloxane/Polyhydroxystyrene 86/7/7)

TABLE 14

Hydrazone formulations Containing PTHFC Diol

| | Control 6 | Composition 6 |
|---|---|---|
| DEH | 28 g | 28 g |
| Polycarbonate-A | 42 g | 42 g |
| PTHFC diol | 0 g | 0.70 g |
| Tetrahydrofuran | 210 g | 210 g |
| 1,4-Dioxane | 70 g | 70 g |
| Savinyl Yellow | 0.35 g | 0.35 g |
| Surfactant (DC-200) | 6 drops | 6 drops |

The following Table 15 compares the electrostatic stability as measured in an in-house electrostatic tester and a Lexmark Optra S 2450 printer for photoconductor drums made up using the polyTHFC diol additive from Table 14.

TABLE 15

Comparison of Fatigue Associated in Hydrazone Transports Containing PolyTHFC Diol (0% and 1%)

| Poly THFC % | $V_0 \mu J/cm^2$ (0 k/1 k) | $V_{0.25} \mu J/cm^2$ (0 k/1 k) | $V_1 \mu J/cm^2$ (0 k/1 k) | Dark Decay (0 k/1 k) | Discharge Voltage (0 k/1 k)* | Fatigue* (0 k/10 k) |
|---|---|---|---|---|---|---|
| 0% | −741/−749 | −174/−146 | −131/−130 | 43/84 | −128/−111 | +17 |
| 1% | −738/−741 | −141/−147 | −128/−134 | 28/68 | −118/−107 | +11 |

*Indicates electostatics as measured in a Lexmark Optra S 2450 printer.

The addition of polyTHFC diol in a hydrazone based transport also helps control the fatigue in the system.

It is apparent from the above results that the use of polyaliphatic carbonate diols, in charge transport layers lowers the dark decay, improves the electrical cycling and results in stable print quality.

General Description

The charge transport layers of this invention are widely used geographically. The temperatures at which the layers are manufactured are much more restricted, e.g., 70° F.–250° F.

Those skilled in the art will be able to determine those mixtures of binder, co-binder, charge transport additive, etc., components for specific predetermined manufacturing and operating conditions with minimal routine experimentation because the examples provide the detail needed for the testing of materials for charge transport layer formulation. Thus, the required properties are well known for every component except the co-binders.

With this background, additional embodiments and alternatives within the scope of the claimed invention will be apparent to one of ordinary skill in the art.

What is claimed is:

1. In a charge transport layer of an electrophotographic photoreceptor, the improvement comprising at least one co-binder having the formula:

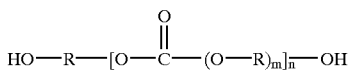

where: R is aliphatic hydrocarbon containing 3 to about 13 carbon atoms, m is 1 to about 7 and n is 3 to about 50.

2. The charge transport layer of claim 1 wherein R is about 4 to about 10 carbon atoms, m is 1 to about 7 carbon atoms and n is 3 to about 30.

3. The charge transport layer of claim 1 wherein R is about 4 to about 6 carbon atoms, m is 1 to about 7 carbon atoms, and n is 3 to about 15 carbon atoms.

4. The charge transport layer of claim 2 wherein R is a linear hydrocarbon moiety.

5. The charge transport layer of claim 4 wherein R can have at least one of a low molecular weight primary and secondary aliphatic hydrocarbon substituent.

6. The charge transport layer of claim 1 wherein the at least one co-binder compound is a poly(hexamethylene carbonate).

7. The charge transport layer of claim 1 wherein the co-binder is a poly(hexamethylene) carbonate diol having the formula:

where m is 1 hexamethylene unit and n is 3 to about 15.

8. The charge transport layer of claim 1 wherein the co-binder is a poly(polytetrahydrofuran carbonate) diol.

9. The charge transport layer of claim 1 wherein the co-binder is poly(polytetrahydrofuran carbonate) diol having the formula:

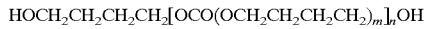

where m is 3 to about 4 polytetrahydrofuran units and n is 3 to about 15 repeating units.

10. The charge transport layer of claim 1 wherein the co-binder was one of a solution or a dispersion prior to blending into the charge transport layer.

11. The charge transport layer of claim 1 wherein the co-binder has a molecular weight of about 200 to about 10,000.

12. The charge transport layer of claim 1 wherein the co-binder has a molecular weight of about 200 to about 5000.

13. The charge transport layer of claim 1 wherein the co-binder has a molecular weight of about 200 to about 2000.

14. The charge transport layer of claim 1 wherein the co-binder compounds range from flexible viscous semi-solids to substantially rigid solids at manufacturing and operating temperatures.

15. The charge transport layer of claim 1 further including at least one binder from the group consisting of polycarbonates, polyesters, polystyrenes, polyvinylchlorides, epoxy resins, phenoxy resins, polyvinylbutyral and polyvinylchloride/polyvinyl acetate copolymers having the properties of a binder.

16. The charge transport layer of claim 15 wherein the at least one binder is at least one of a polycarbonate, polyester and polystyrene having the properties of a binder.

17. The charge transport layer of claim 15 further including at least one of an arylamine, a benzidine, a hydrazone and a stilbene having the properties of a charge transport compound.

18. The charge transport layer of claim 16 further including at least one of an arylamine, a benzidine, a hydrazone and a stilbene having the properties of a charge transport compound.

19. The charge transport layer of claim 18 further including at least one of a polytetrafluoroethylene and a polysiloxane.

20. A charge transport layer comprising at least one polycarbonate, polyester and polystyrene having the properties of a binder; at least one co-binder having the formula

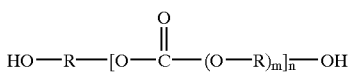

where R is aliphatic hydrocarbon containing 3 to about 13 carbon atoms, m is 1 to about 7 and n is about 3 to about 50, the co-binder having a molecular weight of about 200 to about 2,000.

21. The charge transport layer of claim 20 wherein m is 1 to about 7 and n is about 3 to about 15 and R is linear hydrocarbon moiety.

22. The charge transport layer of claim 20 wherein the co-binder is a poly(hexamethylene) carbonate diol having the formula:

where m is 1 hexamethylene unit and n is 3 to about 15.

23. The charge transport layer of claim 20 wherein the co-binder is poly(polytetrahydrofuran carbonate) diol having the formula:

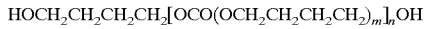

where m is 3 to about 4 polytetrahydrofuran units and n is 3 to about 15 repeating units.

24. The charge transport layer of claim 20 wherein m is 1 to about 7 and n is about 3 to about 15 and R is linear hydrocarbon moiety and the charge transport layer further includes at least one of an arylamine, a benzidine, a hydrazone and a stilbenes.

25. The charge transport layer of claim 24 which has been cured with ultraviolet light.

26. In a charge transport layer, the improvement comprising a polyhexamethylene/carbonate diol having the formula

where m is 1 hexamethylene unit and n is 3 to about 15.

27. In a charge transport layer, the improvement comprising a polyhexamethylene/carbonate diol having the formula:

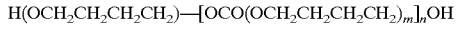

where m is 3 to about 4 polytetrahydrofuran units and n is 3 to about 15 repeating units.

* * * * *